United States Patent
Jones et al.

(10) Patent No.: US 10,044,441 B2
(45) Date of Patent: Aug. 7, 2018

(54) CATV NETWORK DEVICE ENERGY REDUCTION BY PROVIDING AMPLIFIER CONTROL IN RESPONSE TO CHANNEL LOADING

(71) Applicant: Applied Optoelectronics, Inc., Sugar Land, TX (US)

(72) Inventors: Michael Jones, Grayson, GA (US); Rafael Celedon, Atlanta, GA (US)

(73) Assignee: Applied Optoelectronics, Inc., Sugar Land, TX (US)

(*) Notice: Subject to any disclaimer, the term of this patent is extended or adjusted under 35 U.S.C. 154(b) by 0 days.

(21) Appl. No.: 15/295,189

(22) Filed: Oct. 17, 2016

(65) Prior Publication Data

US 2018/0109319 A1    Apr. 19, 2018

(51) Int. Cl.
*H04B 10/2575* (2013.01)
*H04B 10/564* (2013.01)
*H04B 17/00* (2015.01)

(52) U.S. Cl.
CPC ..... *H04B 10/25751* (2013.01); *H04B 10/564* (2013.01); *H04B 17/0082* (2013.01)

(58) Field of Classification Search
CPC .............................................. H04B 10/25751
See application file for complete search history.

(56) References Cited

U.S. PATENT DOCUMENTS

| | | | |
|---|---|---|---|
| 7,688,828 B2 | 3/2010 | Chapman et al. | |
| 8,107,814 B2 | 1/2012 | Kien et al. | |
| 9,049,491 B2 | 6/2015 | Ling et al. | |
| 9,130,769 B2 | 9/2015 | Chapman | |
| 9,246,701 B2 | 1/2016 | Chapman | |
| 2015/0304064 A1* | 10/2015 | Mutalik | H04J 14/0221 398/48 |

OTHER PUBLICATIONS

Jorge D. Salinger, "Remote PHY: Why and How", CABLELABS-NCTA-SCTE 2016 Spring Technical Forum, 2014, 16 pages, http://www.nctatechnicalpapers.com/Paper/2014/2014-remote-phy-why-and-how.

CableLabs, "Data-Over-Cable Service Interface Specifications DCA-MHAv2, Remote PHY Specification, CM-SP-R-PHY-I04-160512", May 12, 2016, 222 pages, https://apps.cablelabs.com/specification/CM-SP-R-PHY.

* cited by examiner

*Primary Examiner* — Shi K Li
(74) *Attorney, Agent, or Firm* — Grossman Tucker Perreault & Pfleger, PLLC; Norman S. Kinsella (57) ABSTRACT

Energy reduction in a CATV network device, such as an optical node, in a CATV network may be accomplished using a system and method for controlling an amplifier in response to channel loading. The system and method detects a channel loading condition for a CATV RF signal including a plurality of utilized channels across a channel spectrum defining a plurality of potential channels. The channel loading condition may be detected by scanning the CATV RF signal to measure the channel loading or by obtaining channel loading data from a remote PHY device (RPD) located in the optical node. The system and method then obtains an amplifier operating parameter associated with the channel loading condition and applies the amplifier operating parameter to control power consumption of an amplifier in the optical node (e.g., by changing bias current) in response to the channel loading condition.

26 Claims, 5 Drawing Sheets

CATV NETWORK DEVICE ENERGY REDUCTION BY PROVIDING AMPLIFIER CONTROL IN RESPONSE TO CHANNEL LOADING

TECHNICAL FIELD

The present disclosure relates to CATV hybrid fiber-coaxial (HFC) networks and more particularly, to energy reduction in a CATV network device, such as an optical node, by providing amplifier control in response to channel loading.

BACKGROUND INFORMATION

One of the challenges faced by expanding data and communications networks is the amount of energy required to power various network devices (e.g., transmitters, receivers, and amplifiers) in such networks. In addition to increased costs associated with the required energy, inefficient energy dissipation may also generate heat that can adversely affect the operation of the components.

An optical node in a hybrid fiber-coaxial (HFC) network, such as a CATV network, is one example of a network device that presents a unique challenge with respect to limiting the amount of energy dissipated in the node. The optical nodes in a CATV/HFC network receive optical signals from a CATV headend/hub and generate the CATV RF electrical signals to be carried over coaxial cables to subscriber locations. In addition to transmitters and receivers, CATV optical nodes generally include RF amplifiers for amplifying the RF signals. These RF amplifiers are designed to amplify the full channel spectrum capable of being used for CATV RF signals and tend to be inefficient. Thus, amplification of the CATV RF signals may consume significant power while generating excessive heat, particularly with the expanding bandwidth of CATV networks.

Moreover, CATV/HFC networks have evolved such that functionality and components are being moved from the headend/hub to the optical nodes. Physical layer or PHY components previously located in a cable modem termination system (CMTS) at a CATV headend, for example, are now being located in the optical nodes as a remote PHY device (RPD). These modifications improve the quality of the RF signals, allow the optical nodes to be moved closer to the subscriber locations to service fewer subscribers, and increase throughput (e.g., from 1G to 10G). Including additional functionality and components, such as a RPD, in the optical node, however, may create additional challenges with respect to reducing power consumption and limiting energy dissipation and heat.

SUMMARY

Consistent with an embodiment, a method for energy reduction in a network device of a CATV network, the method including: detecting a channel loading condition for a CATV RF signal including a plurality of utilized channels across a channel spectrum defining a plurality of potential channels; obtaining an amplifier operating parameter associated with the channel loading condition; and applying the amplifier operating parameter to control power consumption of an RF amplifier in the network device in response to the channel loading condition.

Consistent with another embodiment, an amplifier control system is provided for controlling power consumption of an RF amplifier in a network device of a CATV network. The amplifier control system includes a channel loading detector configured to detect a channel loading condition for a CATV RF signal including a plurality of utilized channels across a channel spectrum defining a plurality of potential channels. The amplifier control system also includes an amplifier controller configured to obtain an amplifier operating parameter associated with the channel loading condition and to apply the amplifier operating parameter to control power consumption of the RF amplifier in the network device in response to the channel loading condition. The amplifier control system further includes an amplifier operating parameter table including a plurality of amplifier operating parameters associated with a plurality of channel loading conditions.

Consistent with a further embodiment, an amplifier control system includes: means for detecting a channel loading condition for a CATV RF signal including a plurality of utilized channels across a channel spectrum defining a plurality of potential channels; means for obtaining an amplifier operating parameter associated with the channel loading condition; and means for applying the amplifier operating parameter to control power consumption of the RF amplifier in a network device in response to the channel loading condition Consistent with yet another embodiment, an optical node is provided for use in a CATV network. The optical node includes a remote PHY device (RPD) configured to receive a digital optical signal and to generate a CATV RF electrical signal from the digital optical signal. The CATV RF electrical signal includes a plurality of utilized channels across a channel spectrum defining a plurality of potential channels. The optical node also includes a channel loading detector configured to obtain channel loading data from the RPD representing a channel loading condition across the channel spectrum. The optical node further includes an RF amplifier configured to amplify the CATV RF electrical signal and an amplifier controller configured to obtain an amplifier operating parameter associated with the number of utilized channels and to apply the amplifier operating parameter to control bias current of the RF amplifier in response to the channel loading condition.

Consistent with yet another embodiment, the optical node includes an optical receiver configured to receive a CATV analog RF optical signal and to convert the CATV analog RF optical signal to a CATV RF electrical signal. The CATV RF electrical signal includes a plurality of utilized channels across a channel spectrum defining a plurality of potential channels. The optical node also includes a spectrum analyzer configured to scan the CATV RF signal to measure channel loading across the channel spectrum. The optical node further includes an RF amplifier configured to amplify the CATV RF signal and an amplifier controller configured to obtain an amplifier operating parameter associated with the measured channel loading and to apply the amplifier operating parameter to control bias current of the RF amplifier in response to the measured channel loading.

BRIEF DESCRIPTION OF THE DRAWINGS

These and other features and advantages will be better understood by reading the following detailed description, taken together with the drawings wherein.

DETAILED DESCRIPTION

Energy reduction in a CATV HFC network device, such as an optical node in a CATV network, may be accomplished by using a system and method for controlling amplifier power consumption in response to channel loading or utilization, consistent with embodiments of the present disclosure. The system and method detects a channel loading condition for a CATV RF signal including a plurality of utilized channels across a channel spectrum defining a plurality of potential channels. The channel loading condition may be detected by scanning the CATV RF signal to measure channel loading of the utilized channels or by obtaining channel loading data from a remote PHY device (RPD) located in the optical node or other HFC network device. The system and method then obtains an amplifier operating parameter associated with the channel loading condition and applies the amplifier operating parameter to control power consumption of an RF amplifier in the optical node (e.g., by adjusting bias current) in response to the channel loading condition.

As such, the system and method allows the amplifier power consumption to be decreased to a level appropriate for the detected channel loading to avoid unnecessary power consumption and energy dissipation in the node. The appropriate power consumption level is at least the minimum level to amplify the utilized channels in the CATV RF signal with minimal or no impact to amplifier operating characteristics and may be higher than the minimum level by some predetermined amount (e.g., to allow additional utilized channels). In the exemplary embodiments, amplifier power consumption is controlled by controlling bias current to an RF amplifier. At maximum bias current (i.e., biased for maximum channel loading and high composite power), RF amplifiers tend to be more inefficient (e.g., as low as 3% efficient) with the excess power being dissipated as heat. Thus, reducing the bias current to a level appropriate for the channel loading may improve efficiency and lower energy/heat dissipation.

As used herein, "channel spectrum" refers to a predefined range of radio frequencies divided into a plurality of sub-ranges of frequencies (referred to as physical channels) and capable of being modulated to carry information and "utilized channels" refer to the physical channels in the channel spectrum that are actually being used to carry information in an RF signal. A "CATV channel spectrum" is a channel spectrum used for delivering video and/or data in a CATV network and is not limited to a particular range of frequencies. As used herein, "composite power" refers to the total power of all of the utilized channels across the channel spectrum in an RF signal. As used herein, "channel loading condition" refers to any condition indicative of the utilized channels loaded across the channel spectrum of the RF signal including, without limitation, a number of utilized channels, identification of utilized channels, location of utilized channels in the channel spectrum, and/or measured composite power. As used herein, "amplifier operating parameter" refers to a parameter associated with operating an RF amplifier and capable of being controlled to change the bias current of the RF amplifier.

As used herein, "module" is a structural term referring to a self-contained assembly of components (e.g., electronic, optical or opto-electronic components) that together perform a dedicated function. The "modules" discussed herein (e.g., optical receiver module and RF amplifier module) are used as the names for structure and thus the term "module" is not being used as a nonce word in the present application. As used herein, the terms "circuit" and "circuitry" refer to physical electronic components (i.e., hardware) and any software and/or firmware (i.e., code), which may configure the hardware, be executed by the hardware, and/or otherwise be associated with the hardware. A particular processor and memory, for example, may comprise a first "circuit" when executing a first portion of code to perform a first function and may comprise a second "circuit" when executing a second portion of code to perform a second function.

Figure 1:
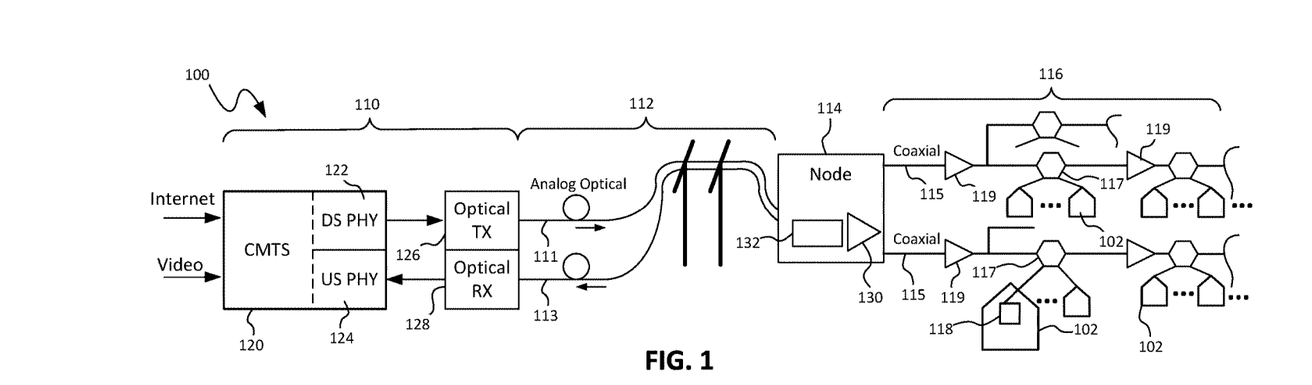
FIG. 1 is a schematic diagram of a CATV network including an optical node that receives CATV RF analog optical signals and provides amplifier control in response to channel loading, consistent with an embodiment of the present disclosure.
Figure 2:
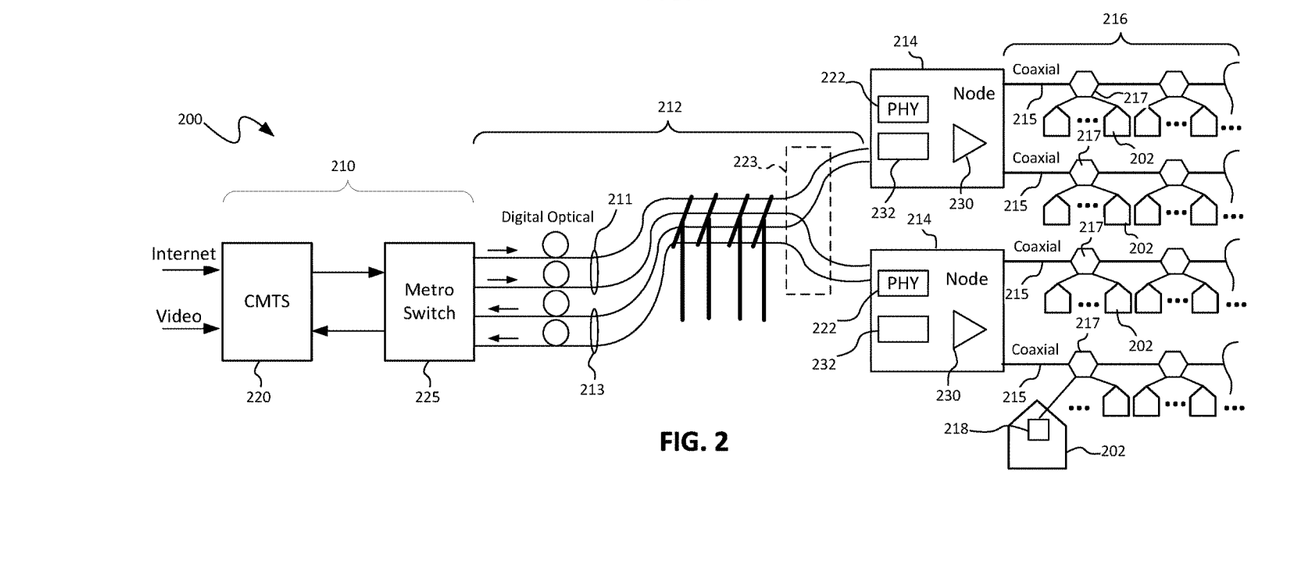
FIG. 2 is a schematic diagram of a CATV network including an optical node with a remote PHY device that receives digital optical signals and provides amplifier control in response to channel loading, consistent with another embodiment of the present disclosure.

Referring to FIGS. 1 and 2, examples of CATV networks 100, 200 including a system for controlling amplifier power consumption in response to channel loading, consistent with embodiments of the present disclosure, are described in greater detail. In general, the CATV networks 100, 200 are hybrid fiber-coaxial (HFC) networks capable of delivering both cable television programming (i.e., video) and IP data services (e.g., internet and voice over IP) to customers or subscribers 102, 202 through the same fiber optic cables and coaxial cables (i.e., trunk lines). Such CATV networks 100, 200 are commonly used by service providers, such as Comcast Corporation, to provide combined video, voice and broadband internet services to the subscribers 102, 202. Although example embodiments of CATV networks are described herein based on various standards (e.g., Data over Cable Service Interface Specification or DOCSIS), the concepts described herein may be applicable to other embodiments of CATV networks using other standards.

Multiple cable television channels and IP data services (e.g., broadband internet and voice over IP) may be delivered together simultaneously in the CATV networks 100, 200 by transmitting signals using frequency division multiplexing over a plurality of physical channels across a CATV channel spectrum. One example of the CATV channel spectrum includes 158 channels (6 MHz wide) from 54 MHz to 1002 MHz, but the CATV channel spectrum may be expanded even further, for example, to 1218 MHz or 1794 MHz, to increase bandwidth for data transmission. In a CATV channel spectrum, some of the physical channels may be allocated for cable television channels and other physical channels may be allocated for IP data services. Other channel spectrums and bandwidths may also be used and are within the scope of the present disclosure. In addition to the signals being carried downstream to deliver the video and IP data to the subscribers 102, 202, the CATV networks 100, 200 may also carry signals (e.g., IP data or control signals) upstream from the subscribers, thereby providing bi-directional communication over the trunks.

The CATV networks 100, 200 also use various modulation and transmission techniques for transmitting signals including the video and IP data. Analog cable television channels have been delivered by modulating RF carriers within the CATV channel spectrum using amplitude and frequency modulation and transmitting the modulated signals, for example, according to NTSC standards. An analog cable television channel typically corresponds to and occupies the full bandwidth (e.g., 6 MHz) of a physical channel in the CATV channel spectrum.

In digital cable systems, digital cable television channels and IP data may be delivered by modulating RF carriers within the CATV channel spectrum, for example, using quadrature amplitude modulation (QAM). Using QAM to modulate digital data on RF carriers in the CATV spectrum results in an analog RF signal containing the digital data. A QAM-modulated analog RF signal may be in the form of an optical signal when carried over optical fibers and in the form of an electrical signal when carried over coaxial cables. The QAM-modulated RF carriers within the CATV channel spectrum used to carry digital video and IP data may be referred to as QAM channels, and multiple QAM channels (e.g., multiple digital cable television channels) may occupy the CATV channel spectrum. Digital cable television channels may be modulated and transmitted, for example, according to one or more existing standards such as ITU-T Recommendation J.83 Annex B. IP data may be modulated on RF carriers within the same CATV channel spectrum and transmitted, for example, according to the Data Over Cable Service Interface Specification (DOCSIS). As delivery of video and IP data converges, CATV networks and transmission techniques have evolved such that video may also be delivered as IP data (e.g., video on demand), for example, according to DOCSIS standards.

In CATV networks 100, 200, the CATV signals may be used for broadcast TV transmissions (e.g., digital cable television channels) and for narrowcast transmissions such as video-on-demand (VoD), switched digital video (SDV), and high-speed internet. Narrowcast transmissions are selectively transmitted to a narrow group of subscribers 102, 202, for example, upon request from the subscribers. As such, the transmitted downstream CATV signals may not use the entire downstream CATV channel spectrum because the utilized channels will depend on the demand for narrowcast transmissions.

The CATV networks 100, 200 generally include a headend/hub 110, 210 connected via optical fiber trunk lines 112, 212 to one or more optical nodes 114, 214, which are connected via a coaxial cable distribution network 116, 216 to customer premises equipment 118, 218 at subscriber locations 102, 202. The headend/hub 110, 210 receives, processes and combines the content (e.g., broadcast video, narrowcast video, and internet data) to be carried over the optical fiber trunk lines 112, 212 as optical signals. The optical fiber trunk lines 112, 212 include forward path optical fibers 111, 211 for carrying downstream optical signals from the headend/hub 110, 210 and return or reverse path optical fibers 113, 213 for carrying upstream optical signals to the headend/hub 110, 210. The optical nodes 114, 214 provide an optical-to-electrical interface between the optical fiber trunk lines 112, 212 and the coaxial cable distribution network 116, 216. The optical nodes 114, 214 thus receive downstream optical signals and transmit upstream optical signals and transmit downstream RF electrical signals and receive upstream RF electrical signals.

The cable distribution networks 116, 216 include coaxial cables 115, 215 including trunk coaxial cables connected to the optical nodes 114, 214 and feeder coaxial cables connected to the trunk coaxial cables. Subscriber drop coaxial cables are connected to the distribution coaxial cables using taps 117, 217 and are connected to customer premises equipment 118, 218 at the subscriber locations 102, 202. One or more RF amplifiers 119 may also be coupled to the coaxial cables 116 for amplifying the CATV RF signals being carried to the subscribers 102. The customer premises equipment 118, 218 may include set-top boxes for video and cable modems for data.

The downstream optical signals carried on the forward path optical fibers 111, 211 and the downstream RF electrical signals carried on the coaxial distribution network 116, 216 include the video and downstream IP data being delivered to the subscribers 102, 202 from the headend/hub 110, 210. The downstream optical signals in the CATV network 100 shown in FIG. 1 are analog optical signals (e.g., QAM-modulated on RF carriers in the CATV channel spectrum) and the downstream optical signals in the CATV network 200 shown in FIG. 2 are digital optical signals (e.g., Ethernet or PON signals), as will be described in greater detail below. The upstream optical signals carried on the return path optical fibers 113, 213 and the upstream RF electrical signals carried on the coaxial cables 116, 216 may include upstream IP data and other subscriber data (e.g., control signals for ordering video content).

In the embodiment shown in FIG. 1, the CATV network 100 uses a linear HFC network that carries analog optical signals (e.g., QAM-modulated signals) over the forward path optical fiber 111. In this embodiment, the headend/hub 110 performs the QAM modulation of the digital data and generates downstream QAM-modulated analog RF signals with the video and data to be carried over the forward path optical fiber 111. The headend/hub 110 includes a cable modem termination system (CMTS) 120 to connect the CATV network 100 to a data network, such as the internet, and to provide the MAC and PHY layer connection to cable modems 118 at the subscriber locations 102. The CMTS 120 generally includes a downstream PHY component 122 including downstream PHY-related hardware (e.g., QAM modulators) and an upstream PHY component 124 including the upstream PHY-related hardware (e.g., QAM demodulators). The CMTS 120 may also provide other functions such as routing and MAC control and provisioning. In the CATV network 100 using a linear HFC network, the length of the optical fiber trunk lines 112 may be limited (e.g., about 80 Km) due to noise.

The CATV network 100 may be configured consistent with known standards such as, for example, the DOCSIS 3.1 Physical Layer Specification (CM-SP-PHYv.3.1-109-160602). In one variation of the embodiment shown in FIG. 1, the CMTS 120 may handle all upstream and downstream IP data and a video QAM or edge QAM (EQAM) device (not shown) separately handles downstream video. In another variation of the embodiment shown in FIG. 1, the CMTS 120 may be a modular CMTS core in a modular headend architecture (MHA) and the downstream PHY component 122 may be located in the EQAM device (not shown) in the headend/hub 110. In the MHA configuration, the EQAM device thus handles both downstream data and video and the modular CMTS core handles upstream data and provides the downstream data to the EQAM device over a downstream external PHY interface (DEPI). In a further variation of the embodiment shown in FIG. 1, the CMTS 120 may be an integrated CMTS or Converged Cable Access Platform (CCAP) that handles both data and video.

In the CATV network 100 using analog HFC, the headend/hub 110 also includes an analog optical transmitter 126 and an analog optical receiver 128 and the optical node 114 includes an analog optical transmitter and an analog optical receiver (not shown) for transmitting and receiving the analog optical signals over the analog optical fiber trunk lines 112. With respect to the downstream direction in particular, the downstream PHY component 122 may produce a CATV RF analog signal, for example, by modulating the data and/or video on the channels across the CATV channel spectrum using quadrature amplitude modulation (QAM). The optical transmitter 126 converts the CATV RF analog signal into an optical signal and transmits the analog RF optical signal over the forward path optical fiber 111.

The optical receiver in the optical node 114 receives the analog RF optical signal and converts the analog optical signal into an electrical RF signal. The RF signal is then amplified by an RF amplifier 130 in the optical node 114 and transmitted on the coaxial cable distribution network 116 to the subscriber locations 102. An amplifier control system 132 in the optical node 114 controls power consumption of the amplifier 130 in response to channel loading in the RF signals being sent over the coaxial cable distribution network 116. In this embodiment, the amplifier control system 132 may detect the channel loading by scanning the RF signals and measuring a channel loading condition, as will be described in greater detail below. Following the optical node 114, an additional number (n) of amplifiers 119 in the coaxial cable distribution network 116 (i.e., N+n) amplify the RF signals to reach additional subscriber locations 102.

In the embodiment shown in FIG. 2, the CATV network 200 uses a digital HFC network that carries digital optical signals over the forward path optical fiber 211. In this embodiment, the headend/hub 210 includes a cable termination system (CMTS) 220 with the PHY components removed (e.g., a CMTS core) and a remote PHY device 222 is located in the optical node(s) 214 to perform the QAM modulation of the digital data to generate QAM modulated CATV RF signals in the node(s) 214. The digital HFC network allows increased throughput on the fiber (e.g., 10G) and longer distances of the optical fiber trunk lines 212. In the CATV network 200, the optical nodes 214 may thus be moved closer to the subscriber locations 202 and the need for additional RF amplifiers in the coaxial distribution network 216 may be reduced or eliminated (e.g., N+0 or N+1). The digital optical fiber trunk lines 212 provide a packet-based link (e.g., using Ethernet or PON) between the headend/hub 210 and the optical node(s) 214. The use of digital optics also allows a metro switch 225 to be used to switch to multiple digital optical fibers 211, 213.

The CATV network 200 and the remote PHY device 222 may be configured consistent with known standards such as, for example, the DOCSIS Modular Headend Architecture v2 Specification (CM-SP-R-PHY-I04-160512) and the Remote PHY Specification (CM-TR-MHAv2-V01-150615). The CMTS 220 may be implemented as a CCAP core including both a CMTS core to provide DOCSIS functionality (e.g., framing) and an EQAM core to provide video processing. The remote PHY device 222 in the optical node(s) 214 may include PHY related circuitry such as downstream QAM modulators and upstream QAM demodulators and pseudowire logic to connect to the CCAP core. In another variation of the embodiment shown in FIG. 2, the remote PHY device 222 may be located in a shelf 223 connected to the optical fiber trunk lines 212.

In the CATV network 200, the headend/hub 210 and the optical node 214 also include digital optical transmitters and receivers (not shown) for transmitting and receiving the digital optical signals. The remote PHY device 222 in the optical node 214 receives the downstream digital optical signal and generates an analog electrical RF signal. For example, the remote PHY device 222 receives the digital packets containing video and/or IP data and performs the QAM modulation to generate the analog RF signal. The RF signal is then amplified by an RF amplifier 230 in the optical node 214 and transmitted on the coaxial cable distribution network 216 to the subscriber locations 202. An amplifier control system 232 in the optical node 214 controls the power consumption of the amplifier 230 in response to channel loading in the RF signals being sent over the coaxial cable distribution network 216. In this embodiment, the amplifier control system 232 may detect the channel loading by obtaining channel loading data from the remote PHY device 222 when the CATV RF signals are generated by the remote PHY device 222 in the optical node 214, as will be described in greater detail below. Because the digital HFC network in the CATV network 200 allows the optical fiber to go deeper, the coaxial cable distribution network 216 may not use any additional RF amplifiers (e.g., N+0).

Figure 3:
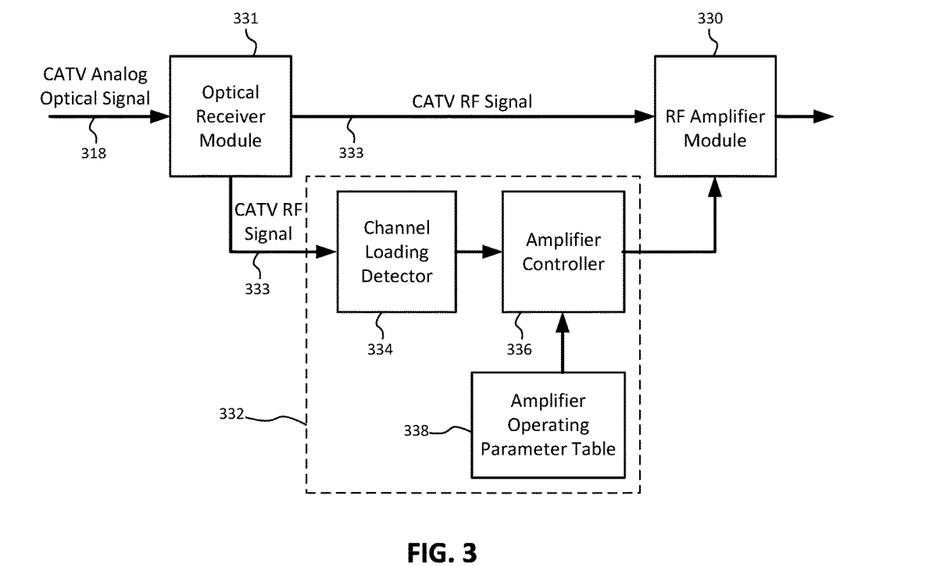
FIG. 3 is a schematic diagram of an embodiment of a system for controlling amplifier current in response to channel loading in an optical node of the CATV network shown in FIG. 1.

Referring to FIG. 3, a closed loop amplifier control system 332 for use in the CATV network 100 is shown and described in greater detail. In this embodiment, an optical receiver module 331 in the optical node receives a CATV RF analog optical signal 318 and converts the analog optical signal to an RF electrical signal 333. The RF signal 333 is amplified by an RF amplifier module 330 in the optical node before being sent over the coaxial cable distribution network (not shown) to subscriber locations. The amplifier control system 332 scans the analog CATV RF signal 333 to detect a channel loading condition and controls the current provided to the RF amplifier module 330 in response to the channel loading condition.

The optical receiver module 331 may be any optical receiver module known to those skilled in the art for use in a CATV optical node for receiving CATV analog optical signals, such as, for example, the optical receiver modules available from Applied Optoelectronics, Inc. The RF amplifier module 330 may be an RF amplifier module known to those skilled in the art for use in a CATV optical node for amplifying CATV RF signals such as, for example, the type available from Applied Optoelectronics, Inc. Although the RF amplifier module 330 is shown amplifying a single RF signal 333, the RF amplifier module 330 may include multiple RF amplifiers for amplifying multiple RF signals, for example, in a segmented optical node.

The amplifier control system 332 includes a channel loading detector 334, such as a spectrum analyzer, that scans the CATV RF analog signal 333 to detect the channel loading condition by measuring the frequency and amplitude of the spectrum and calculating the composite power of the utilized channels in the RF signal 333. One example of a spectrum analyzer that may be used includes the MXL 241 chip available from MaxLinear Inc. The channel loading detector 334 may produce a channel loading signal, for example, a digital word value representing the calculated composite power value.

The amplifier control system 332 also includes an amplifier controller 336 that controls the current provided to the RF amplifier module 330 in response to the channel loading condition of the analog RF signal. For example, if the RF amplifier module 330 is operating at a full spectrum power level capable of amplifying all of the channels in the channel spectrum and the channel loading condition indicates that the number of utilized channels are fewer than the number channels in the channel spectrum, the amplifier controller 336 may decrease the current provided by the RF amplifier module 330 to a lower level that is appropriate for the channel loading condition and still capable of amplifying the utilized channels. In an example embodiment, the amplifier controller 336 uses a calculated composite power value to obtain a corresponding amplifier operating parameter and applies the corresponding amplifier operating parameter to the RF amplifier module 330. The amplifier operating parameters may include, for example, target amplifier bias currents that provide the level of current appropriate for the measured channel loading condition (i.e., sufficient to amplify the utilized channels without providing unnecessary amplification of unutilized channels).

In the illustrated embodiment, the amplifier control system 332 includes an amplifier operating parameter table 338 including a plurality of amplifier operating parameters (e.g., target bias currents) corresponding to a plurality of channel loading conditions (e.g., composite power values). The amplifier controller 336 may include, for example, circuitry for receiving the calculated composite power value, circuitry for obtaining corresponding operating parameters from the table 338, and circuitry for setting the bias current for the RF amplifier module 330. To set the bias current, for example, the amplifier controller 336 may adjust or vary a bias current of the RF amplifier module 330 until the bias current substantially matches the target bias current. The amplifier controller 336 and amplifier operating parameter table 338 may be implemented using any combination of hardware (e.g., a microprocessor and memory), software and/or firmware programmed to provide the functions described herein. The composite power detector 334 and the amplifier controller 336 may be implemented together, for example, using the same microprocessor and memory. The channel loading detector 334 and the amplifier controller 336 may also be implemented in other ways, for example, using a hard wired circuit.

Figure 4:
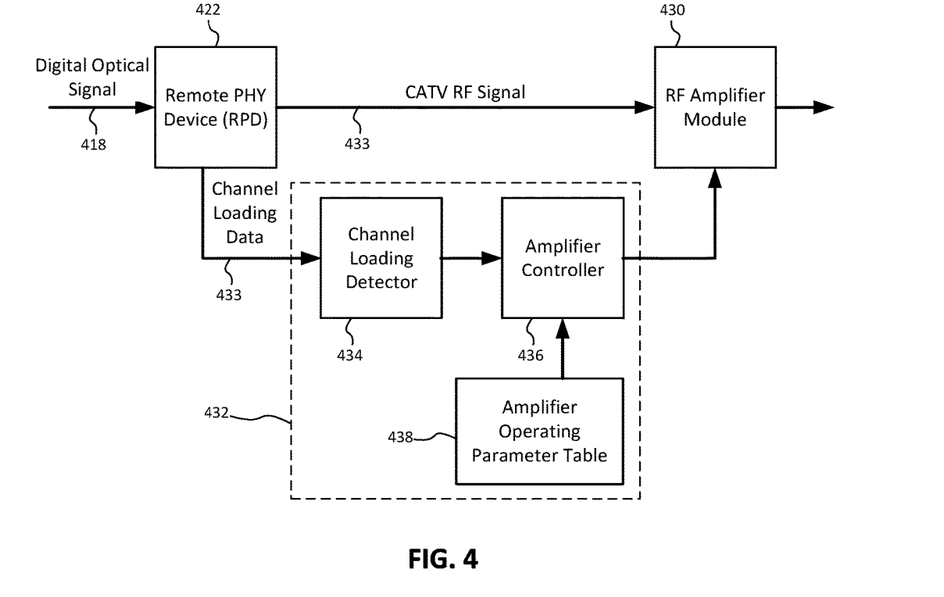
FIG. 4 is a schematic diagram of another embodiment of a system for controlling amplifier current in response to channel loading in an optical node of the CATV network shown in FIG. 2.

Referring to FIG. 4, an open loop amplifier control system 432 for use in the CATV network 200 is shown and described in greater detail. In this embodiment, a remote PHY device 422 (e.g., in an optical node) receives a digital optical signal 418 and generates the CATV electrical RF signal 433, for example, by QAM modulating the video and IP data on the CATV channels in the CATV channel spectrum. The CATV RF signal 433 is then amplified by an RF amplifier module 430 in the optical node before being sent over the coaxial cable distribution network (not shown) to the subscriber locations. The amplifier control system 432 obtains channel loading data from the remote PHY device (RPD) 422 to detect a channel loading condition and controls the current provided to the RF amplifier module 430 in response to the detected channel loading condition. The RPD 422 may be configured, for example, consistent with the Remote PHY Specification (CM-TR-MHAv2-V01-150615). As mentioned above, the RF amplifier module 430 may be an RF amplifier module known to those skilled in the art for use in a CATV optical node for amplifying CATV RF signals. Although the RF amplifier module 430 is shown amplifying a single RF signal 433, the RF amplifier module 430 may include multiple RF amplifiers for amplifying multiple RF signals, for example, in a segmented optical node.

The amplifier control system 432 includes a channel loading detector 434 that detects a channel loading condition by obtaining channel loading data from the RPD 422. The channel loading data may include, for example, a table provided in the RPD 422 including the channel numbers and the channel state (i.e., on or off). In this embodiment, the channel loading detector 434 may be implemented using any combination of hardware (e.g., a microprocessor and memory), software and/or firmware programmed to read the channel loading data from the RPD 422. The channel loading detector 434 may obtain the channel loading data as the digital video and IP data is buffered by the RPD 422 and the RF signals are being generated in the RPD 422 by QAM modulating the channels with the digital data. Thus, the RPD 422 knows the channel loading conditions before the RF signals are amplified and sent over the coaxial cable distribution network. The channel loading detector 434 may produce a channel loading signal, for example, a digital word value representing the number of utilized channels or some other channel loading condition.

The amplifier control system 432 also includes an amplifier controller 436 that controls the current provided to the RF amplifier module 430 in response to the channel loading condition. For example, if the RF amplifier module 430 is operating at a full spectrum power level capable of amplifying all of the channels in the channel spectrum and the channel loading data indicates that the number of utilized physical channels are fewer than the number channels in the channel spectrum, the amplifier controller 436 may decrease the current provided to the RF amplifier module 430 to a lower level that is appropriate for the channel loading condition and still capable of amplifying the utilized channels. In an example embodiment, the amplifier controller 436 uses the channel loading data (e.g., the number and location of utilized channels) to obtain a corresponding amplifier operating parameter and applies the corresponding amplifier operating parameter to the RF amplifier module 430. The amplifier operating parameters may include, for example, target amplifier bias currents that provide the level of current appropriate for the channel loading condition (i.e., sufficient to amplify the utilized channels without providing unnecessary amplification of unutilized channels).

In the illustrated embodiment, the amplifier control system 432 includes an amplifier operating parameter table 438 including a plurality of amplifier operating parameters (e.g., target bias currents) corresponding to a plurality of channel loading conditions (e.g., numbers and locations of utilized channels). The amplifier controller 436 may include, for example, circuitry for obtaining the channel loading data, circuitry for obtaining the corresponding operating parameters from the table 438, and circuitry for setting the bias current for the RF amplifier module 430. To set the bias current, for example, the amplifier controller 436 may adjust or vary a bias current of the RF amplifier module 330 until the bias current substantially matches the target bias current. The amplifier controller 436 and amplifier operating parameter table 438 may be implemented using any combination of hardware (e.g., a microprocessor and memory), software and/or firmware programmed to provide the functions described herein. The channel loading detector 434 and the amplifier controller 436 may be implemented together, for example, using the same microprocessor and memory. The channel loading detector 434 and the amplifier controller 436 may also be implemented in other ways, for example, using a hard wired circuit.

Figure 5A:
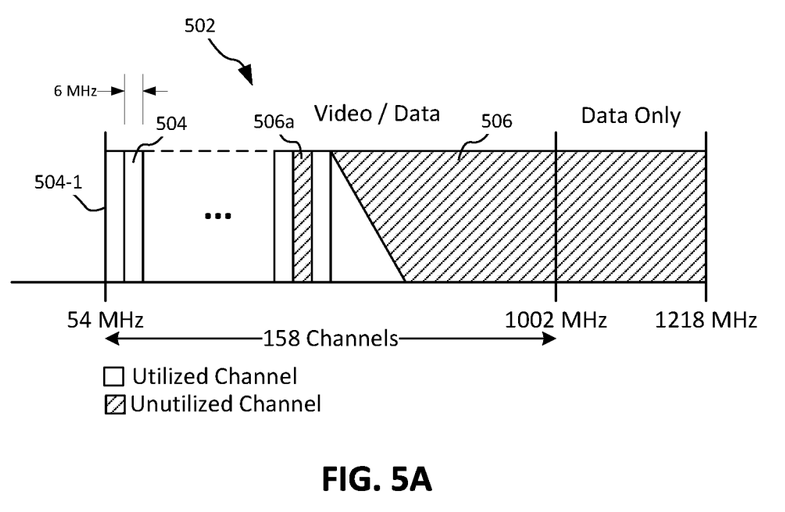
FIG. 5A illustrates one example of a CATV channel spectrum with unutilized channels, consistent with embodiments of the present disclosure.

FIG. 5A illustrates one example of a CATV channel spectrum 502 with utilized channels 504 and unutilized channels 506, which may be amplified consistent with the embodiments of the present disclosure. In this example, 158 physical channels are provided between 54 MHz and 1002 MHz with each physical channel being 6 MHz wide. CATV networks may use these channels to carry both video and IP data. This CATV channel spectrum had been expanded from 870 MHz and may be expanded further (e.g., under new DOCSIS standards) up to 1218 MHz with the additional channels being used to carry only data. When the channel spectrum is expanded, the additional channels are often not used initially, resulting in a number of unutilized channels 506, particularly at the higher frequencies. Also, some physical channels 506a in the channel spectrum 502 may also be unutilized because of lack of subscriber demand for content carried on those channels (e.g., during certain times of the day).

Figure 5B:
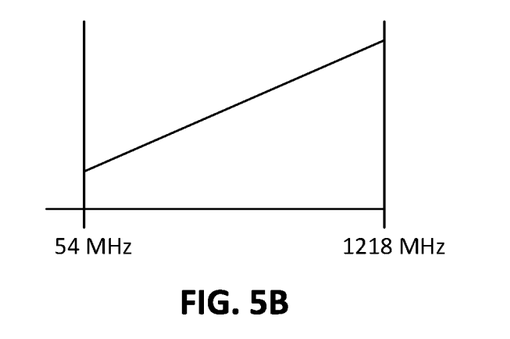
FIG. 5B illustrates one example of power tilt across a CATV channel spectrum, consistent with embodiments of the present disclosure.

As discussed above, the RF amplifiers in the CATV optical nodes are designed to amplify the full CATV channel spectrum 502 of potential channels and thus power is wasted when the unutilized channels 506 are amplified. As shown in FIG. 5B, higher frequency channels in the channel spectrum use more power, resulting in a tilt across the CATV channel spectrum. Because of this tilt, the wasted power caused by amplifying unutilized channels at these higher frequencies may be exacerbated. An amplifier control system, consistent with embodiments described herein, may detect the channel loading across the CATV channel spectrum 502 including the number and location of the utilized channels 504, and may control the amplifier current in response to the detected composite power such that the utilized channels 504 are amplified without unnecessary amplification of unutilized channels 506, thereby reducing unnecessary power consumption by the RF amplifier and energy dissipation in the optical node.

Figure 6:
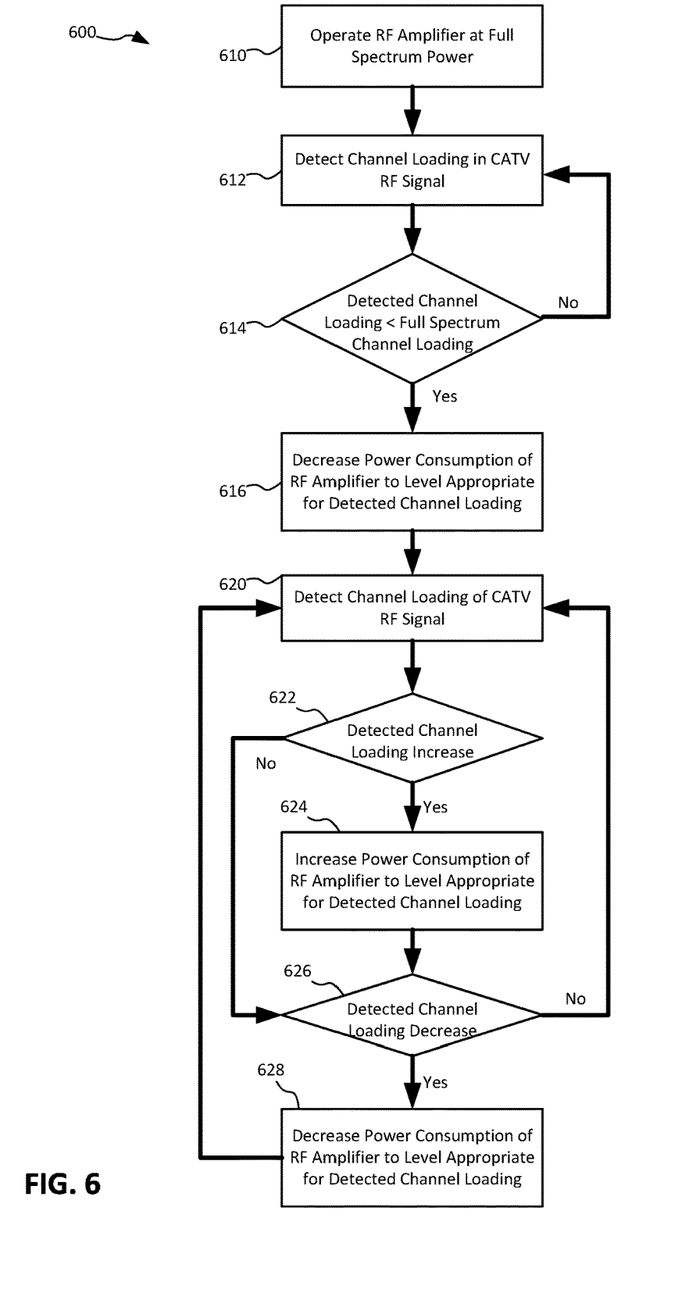
FIG. 6 is a flow chart illustrating one embodiment of a method for amplifier control in response to channel loading.
Figure 7:
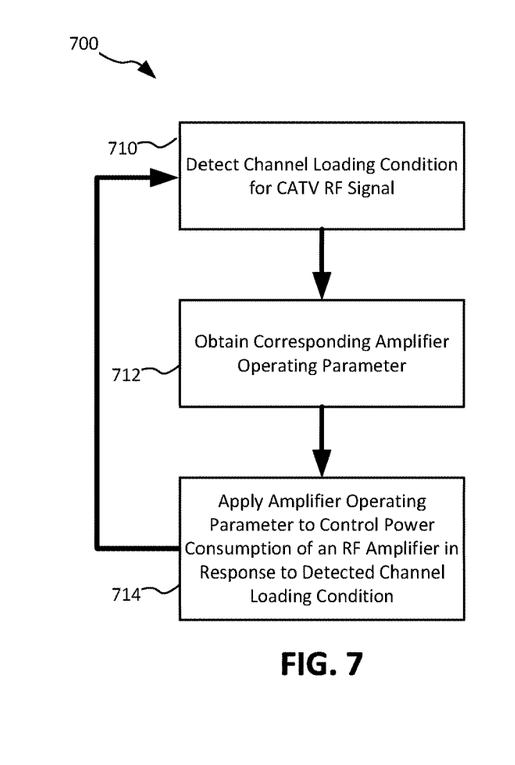
FIG. 7 is a flow chart illustrating another embodiment of a method for amplifier control in response to channel loading.
Figure 8:
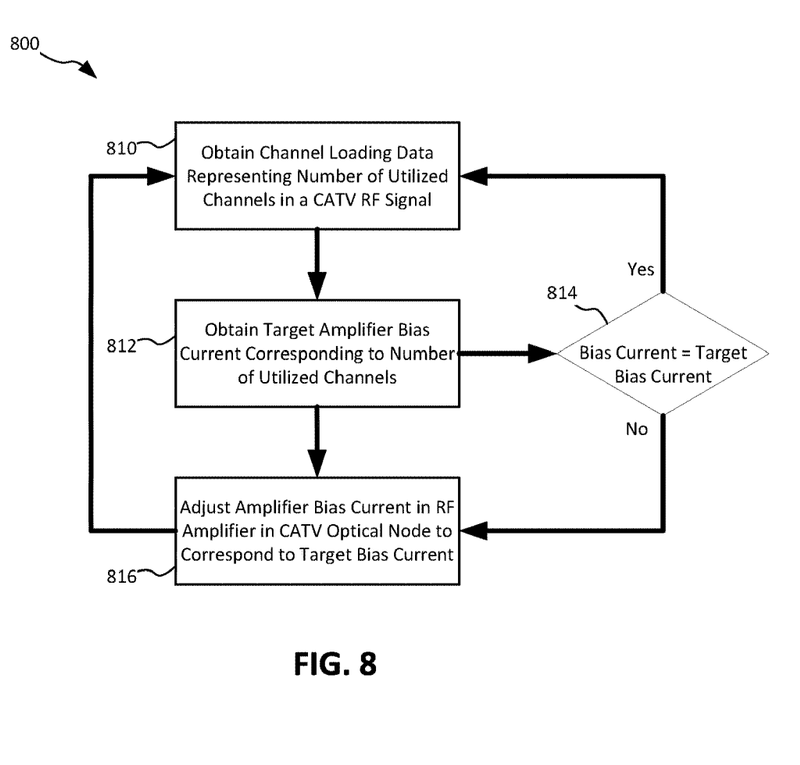
FIG. 8 is a flow chart illustrating a further embodiment of a method for amplifier control in response to channel loading.

Referring to FIGS. 6-8, different embodiments of a method for controlling amplifier power consumption in response to channel loading, consistent with the present disclosure, are shown and described. These different embodiments of the amplifier control method may be performed using the CATV networks and amplifier control systems discussed above.

According to one embodiment of the method 600, shown in FIG. 6, an RF amplifier (e.g., in a CATV optical node) is initially operated 610 at a full spectrum power level (i.e., at the level capable of amplifying all of the potential physical channels in the CATV channel spectrum). The channel loading of the CATV RF signal is detected 612, for example, by measuring composite power for a current channel loading or by obtaining channel loading data representing a current channel loading (e.g., number of utilized channels). If the detected channel loading is determined 614 to be less than the full spectrum channel loading (i.e., when all potential channels in the CATV channel spectrum are utilized), the power consumption of the RF amplifier is decreased 616 to a level that is appropriate for the detected channel loading. The power consumption level that is appropriate is at least the minimum level that is needed to amplify the utilized channels indicated by the detected channel loading and may be higher than the minimum level by a predetermined amount to allow additional utilized channels to be added and amplified.

This method 600 may also continue to detect 620 the channel loading of the CATV RF signal as the number of utilized and unutilized channels change. If the detected channel loading is determined 622 to increase, the power consumption of the RF amplifier is increased 624 to a level appropriate for the detected channel loading. If the detected channel loading is determined to decrease 626, the power consumption of the RF amplifier is decreased 628 to a level appropriate for the detected channel loading. The method 600 may thus dynamically increase and decrease the amplifier power consumption in response to the detected channel loading.

According to another embodiment of the method 700, shown in FIG. 7, a channel loading condition for a CATV RF signal is detected 712, for example, by measuring composite power for a current channel loading or by obtaining channel loading data representing a current channel loading (e.g., number of utilized channels). A corresponding amplifier operating parameter is then obtained 714 (i.e., an amplifier operating parameter that causes the amplifier to provide the power consumption appropriate for the detected channel loading condition). The corresponding amplifier operating parameter is then applied 716 to an RF amplifier (e.g., in a CATV optical node) to control the power consumption (e.g., amplifier current) in response to the detected channel loading condition. This method may be repeated such that channel loading is continuously monitored and amplifier power consumption is dynamically adjusted in response to detected channel loading.

According to a further method 800, shown in FIG. 8, channel loading data representing the number of utilized channels in a CATV RF signal is obtained 810 (e.g., from a remote PHY device) and a target amplifier bias current is obtained 812, for example, from a table. The target amplifier bias current is the bias current that will provide the gain appropriate for the number of utilized channels. If the actual bias current in an RF amplifier (e.g., in a CATV optical node) is determined 814 to be different from the target bias current, the bias current in the RF amplifier is adjusted 816 to correspond to the target bias current. This method may be repeated such that channel loading is continuously monitored and amplifier current is dynamically adjusted in response to detected channel loading.

Accordingly, a system and method for controlling amplifier power consumption in response to detected channel loading, consistent with embodiments of the present disclosure, may be used to reduce power consumption and energy dissipation in an optical node and/or other network devices of a CATV network.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for energy reduction in a network device of a CATV network, the method comprising:

detecting a channel loading condition for a CATV RF signal including a plurality of utilized channels across a channel spectrum defining a plurality of potential channels;

obtaining an amplifier operating parameter associated with the channel loading condition; and applying the amplifier operating parameter to control power consumption of an RF amplifier in the optical node in response to the channel loading condition, wherein the RF amplifier is configured for full spectrum power to amplify the CATV RF signal across all of the potential channels of the channel spectrum, and wherein the amplifier operating parameter reduces amplifier power below the full spectrum power when the plurality of utilized channels are fewer than the plurality of potential channels.

2. The method of claim 1 wherein detecting the channel loading condition includes obtaining channel loading data from a remote PHY device in an optical node, the channel loading data representing the plurality of utilized channels across the channel spectrum of the CATV signal.

3. The method of claim 1 wherein detecting the channel loading condition includes scanning the CATV RF signal to measure channel loading across the channel spectrum of the CATV RF signal.

4. The method of claim 1 wherein the channel spectrum ranges from 54 MHz to 1218 MHz.

5. The method of claim 1 wherein obtaining the amplifier operating parameter includes retrieving the amplifier operating parameter from a table including a plurality of amplifier operating parameters associated with a plurality of channel loading conditions.

6. The method of claim 1 wherein obtaining the amplifier operating parameter includes retrieving the amplifier operating parameter from a table including a plurality of target amplifier bias currents associated with a plurality of channel loading conditions.

7. The method of claim 1 wherein the amplifier operating parameter is a target amplifier bias current and wherein applying the amplifier operating parameter includes changing a bias current to the amplifier to correspond to the target amplifier bias current.

8. The method of claim 1 wherein applying the amplifier operating parameter decreases amplifier bias current when the detected channel loading condition indicates a decrease in utilized channels.

9. The method of claim 1 wherein applying the amplifier operating parameter increases amplifier bias current when the detected channel loading condition indicates an increase in utilized channels.

10. An amplifier control system for controlling an RF amplifier in a network device of a CATV network, the amplifier control system comprising:

a channel loading detector configured to detect a channel loading condition for a CATV RF signal including a plurality of utilized channels across a channel spectrum defining a plurality of potential channels;

an amplifier controller configured to obtain an amplifier operating parameter associated with the channel loading condition and to apply the amplifier operating parameter to control power consumption of the RF amplifier in the network device in response to the channel loading condition; and an amplifier operating parameter table including a plurality of amplifier operating parameters associated with a plurality of channel loading conditions, wherein the amplifier operating parameter table includes numbers of utilized channels associated with amplifier bias currents.

11. The system of claim 10 wherein the channel loading detector is configured to obtain channel loading data from a remote PHY device (RPD) in an optical node, the channel loading data representing the plurality of utilized channels across the channel spectrum of the CATV signal.

12. The system of claim 10 wherein the channel loading detector is configured to scan the CATV RF signal to measure channel loading across the channel spectrum of the CATV RF signal.

13. An amplifier control system for controlling an RF amplifier in a network device of a CATV network, the amplifier control system comprising:

means for detecting a channel loading condition for a CATV RF signal including a plurality of utilized channels across a channel spectrum defining a plurality of potential channels;

means for obtaining an amplifier operating parameter associated with the channel loading condition; and means for applying the amplifier operating parameter to control power consumption of the RF amplifier in the network device in response to the channel loading condition, wherein the RF amplifier is configured for full spectrum power to amplify the CATV RF signal across all of the potential channels of the channel spectrum, and wherein the amplifier operating parameter reduces amplifier power below the full spectrum power when the plurality of utilized channels are fewer than the plurality of potential channels.

14. The system of claim 13 wherein the means for detecting includes a spectrum analyzer.

15. The system of claim 13 wherein the means for obtaining an amplifier operating parameter and the means for applying the amplifier operating parameter include an amplifier controller.

16. An optical node for use in a CATV network, the optical node comprising:

a remote PHY device (RPD) configured to receive a digital optical signal and to generate a CATV RF electrical signal from the digital optical signal, the CATV RF electrical signal including a plurality of utilized channels across a channel spectrum defining a plurality of potential channels;

an RF amplifier configured to amplify the CATV RF electrical signal;

a channel loading detector configured to obtain channel loading data from the RPD representing a channel loading condition across the channel spectrum; and an amplifier controller configured to obtain an amplifier operating parameter associated with the number of utilized channels and to apply the amplifier operating parameter to adjust bias current to the RF amplifier in response to the channel loading condition.

17. The optical node of claim 16 wherein the channel loading condition is the number of utilized channels in the CATV RF electrical signal.

18. The optical node of claim 16 further comprising an amplifier operating parameter table including amplifier operating parameters associated with channel loading conditions.

19. The optical node of claim 16 wherein the amplifier operating parameters include target bias currents.

20. An optical node for use in a CATV network, the optical node comprising:

an optical receiver configured to receive a CATV analog RF optical signal and to convert the CATV analog RF optical signal to a CATV RF electrical signal, the CATV RF electrical signal including a plurality of utilized channels across a channel spectrum defining a plurality of potential channels;

an RF amplifier configured to amplify the CATV RF signal;

a spectrum analyzer configured to scan the CATV RF signal to measure channel loading across the channel spectrum; and an amplifier controller configured to obtain an amplifier operating parameter associated with the measured channel loading and to apply the amplifier operating parameter to adjust bias current to the RF amplifier in response to the measured channel loading.

21. The optical node of claim 20 an amplifier operating parameter table including amplifier operating parameters associated with channel loading conditions.

22. The optical node of claim 20 wherein the amplifier operating parameters include target bias currents.

23. The optical node of claim 20 wherein the RF amplifier is configured for full spectrum power to amplify the CATV RF signal across all of the potential channels of the channel spectrum, and wherein the amplifier controller is configured to reduce amplifier power consumption below the full spectrum power when the plurality of utilized channels are fewer than the plurality of potential channels.

24. A method for energy reduction in a network device of a CATV network, the method comprising:
  detecting a channel loading condition for a CATV RF signal including a plurality of utilized channels across a channel spectrum defining a plurality of potential channels, wherein the channel spectrum ranges from at least 54 MHz to 1218 MHz;
  obtaining an amplifier operating parameter associated with the channel loading condition; and
  applying the amplifier operating parameter to control power consumption of an RF amplifier in the optical node in response to the channel loading condition.

25. An amplifier control system for controlling an RF amplifier in a network device of a CATV network, the amplifier control system comprising:
  a channel loading detector configured to detect a channel loading condition for a CATV RF signal including a plurality of utilized channels across a channel spectrum defining a plurality of potential channels, wherein the channel spectrum ranges from at least 54 MHz to 1218 MHz;
  an amplifier controller configured to obtain an amplifier operating parameter associated with the channel loading condition and to apply the amplifier operating parameter to control power consumption of the RF amplifier in the network device in response to the channel loading condition; and
  an amplifier operating parameter table including a plurality of amplifier operating parameters associated with a plurality of channel loading conditions.

26. An amplifier control system for controlling an RF amplifier in a network device of a CATV network, the amplifier control system comprising:
  means for detecting a channel loading condition for a CATV RF signal including a plurality of utilized channels across a channel spectrum defining a plurality of potential channels, wherein the channel spectrum ranges from at least 54 MHz to 1218 MHz;
  means for obtaining an amplifier operating parameter associated with the channel loading condition; and
  means for applying the amplifier operating parameter to control power consumption of the RF amplifier in the network device in response to the channel loading condition.

* * * * *